United States Patent
Carpenter

(10) Patent No.: US 7,046,132 B2
(45) Date of Patent: May 16, 2006

(54) LAMP MONITOR AND METHOD FOR OPERATING A LAMP MONITOR

(75) Inventor: Kevin P. Carpenter, Wyoming, MI (US)

(73) Assignee: Emergency Technology, Inc., Hudsonville, MI (US)

( * ) Notice: Subject to any disclaimer, the term of this patent is extended or adjusted under 35 U.S.C. 154(b) by 146 days.

(21) Appl. No.: 10/706,258

(22) Filed: Nov. 12, 2003

(65) Prior Publication Data
US 2005/0099315 A1    May 12, 2005

(51) Int. Cl.
*B60Q 11/00*    (2006.01)

(52) U.S. Cl. ............... 340/458; 340/438; 340/635; 340/641; 340/642

(58) Field of Classification Search ........ 340/438, 340/458, 635, 641, 642, 660, 664
See application file for complete search history.

(56) References Cited

U.S. PATENT DOCUMENTS

| | | | |
|---|---|---|---|
| 4,550,303 A | 10/1985 | Steele | |
| 4,786,843 A | 11/1988 | Yamamoto et al. | |
| 5,144,282 A | 9/1992 | Sutterlin et al. | |
| 5,235,317 A | 8/1993 | Sutterlin et al. | |
| 5,241,295 A | 8/1993 | Madau | |
| 5,254,971 A | 10/1993 | Sutterlin et al. | |
| 5,801,623 A * | 9/1998 | Chen et al. | 340/458 |
| 6,788,195 B1 * | 9/2004 | Stegman et al. | 340/458 |

OTHER PUBLICATIONS

Doran Incandescent Exterior Light Monitor, downloaded from www.doranmfg.com/pdf/IncExtMonitorv2.pdf, Feb. 2, 2004.

Remote Exterior Light Monitor Specifications Sheet, downloaded from www.doranmfg.com/pdf/B-4R_C-4R-RemoteExtMon.pdf, Feb. 2, 2004.

Doran LED/Incandescent Electronic Monitoring System, downloaded from www.doranmfg.com/pdf/LEDU_v3.pdf, Feb. 2, 2004.

* cited by examiner

*Primary Examiner*—Daryl C Pope
(74) *Attorney, Agent, or Firm*—Warner Norcross & Judd LLP

(57) ABSTRACT

A lamp monitor for a bus or other motor vehicle has a processor, a current sensor, a memory and a display for monitoring the current through the lamps. In program mode, the processor samples the current passing through the warming lamps and calculates an operating range. In operate mode, if the current sensor detects current passing through the lamp within the operating range, then a status lamp, located near the driver of the bus or motor vehicle, is illuminated.

30 Claims, 5 Drawing Sheets

LAMP MONITOR AND METHOD FOR OPERATING A LAMP MONITOR

BACKGROUND OF THE INVENTION

The present invention relates to lamp monitors, and more particularly to motor vehicle lamp monitors.

Motor vehicles, and particularly buses, have several exterior lamps including stop, turn, tail, reverse and overhead lamps. The lamps may have different voltage and current requirements. Operation of the lamps is very important to the safety of the passengers and other vehicles. If a lamp or other lamp is not operating correctly, the operator of the motor vehicle should be made aware of the problem as soon as possible.

Previously, the operation of the lamps was sensed by a coil inductively coupled to the lamp circuit. If current flowed in the lamp circuit, the inductively coupled coil would illuminate a status lamp located near the driver. By visually inspecting the status lamp, the driver could determine if the particular lamp was operating.

Such an arrangement for status lamps was acceptable for incandescent lamps and other lamps. Lamps are now often made of LEDs (light emitting diodes). LED lamps offer several advantages over incandescent lamps, such as efficiency, improved life span, compactness, weight, and response time.

However, LED lamps often have a wide variety of operating currents. Thus, to use a system of coils to indicate operation of the LED lamps requires a specific coil for each type of LED lamp. Further, the life of an LED lamp is much longer than that of an incandescent lamp. The operational characteristics of the coil may significantly change over the life of an LED lamp, reducing the accuracy of the coil.

In addition, over the life of a vehicle, an incandescent lamp may be substituted for an LED lamp and vice versa.

Further, some buses have a combination of LED lamps and incandescent lamps. The current drawn by the LED lamps and the incandescent lamps differ, requiring different coils for the LED lamps and the incandescent lamps. Obviously, the maintenance of a number of different coils is problematic.

An improved lamp monitor and method for monitoring the status of the lamps is highly desirable.

SUMMARY OF THE INVENTION

The aforementioned problems are overcome in the present invention.

An improved lamp monitor for a bus or other motor vehicle has a processor, current sensors, and a display for monitoring the current through the lamps. The current sensor is connected to the lamps.

At start up during program mode, all lamps are illuminated. The processor determines for each lamp an operating current range. The operating current range is stored in a memory. During operation, the monitor system continually ascertains if the current in the lamp is within the operating current range. If so, a display indicates whether the lamp is properly operating. If the display contains status lamps, a status lamp corresponding to the lamp is illuminated.

Since each lamp's operating range is calculated independently of the other lamps, various types of lamps can be combined on the motor vehicle. Further, if lamps are changed, the lamp monitor automatically calculates a new operating current range for the new lamp.

The advantages of such a lamp monitor are apparent. The lamp monitor is very flexible, allowing for the use of either LEDs, incandescent lamps or both on the motor vehicle. Further, modifications of the lamp system of a motor vehicle can be accomplished without replacing or rewiring the lamp monitor. Finally, because the lamp monitor does not rely on a system of coils, the system is more reliable and less prone to failure.

These and other objects, advantages and features of the invention will be more readily understood and appreciated by reference to the detailed description of the drawings.

DETAILED DESCRIPTION OF THE DRAWINGS

Figure 1:
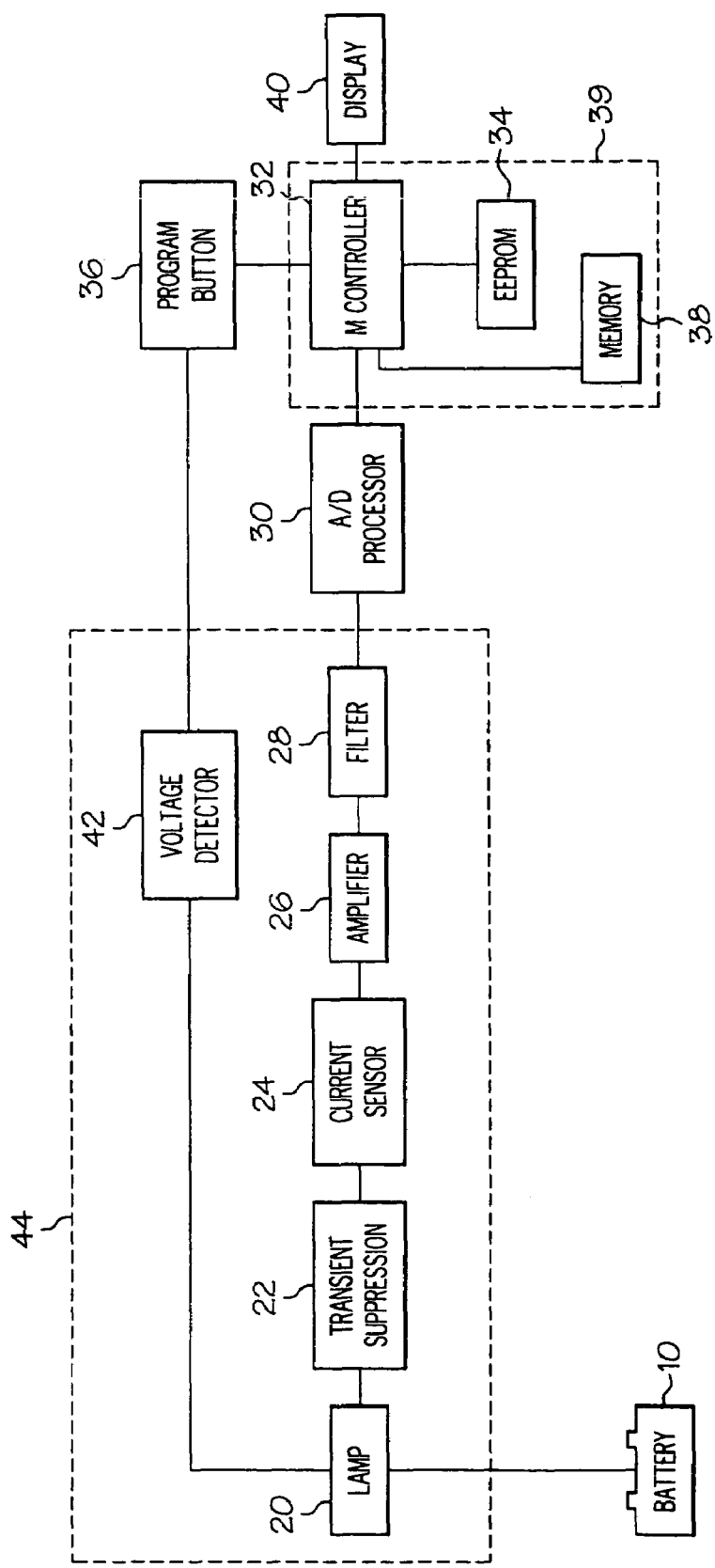
FIG. 1 is a block diagram of a circuit for a bus lamp monitor.

FIG. 1 shows a block diagram of a circuit for a lamp monitor suitable for use in a motor vehicle such as a school bus. Battery 10 powers lamp 20. Battery 10 has a battery voltage. As is well known, if the battery voltage falls below the minimum battery operating voltage or rises above a maximum battery operating voltage, the operation of lamp 20 could be seriously affected, especially if lamp 20 is an LED.

Lamp 20 is connected to transient suppression circuit 22. Transient suppression circuit 22 removes any random voltage or current surges. Transient suppression circuit 22 is coupled to current sensor 24. Current sensor 24 detects whether any current is flowing to lamp 20. Ideally, lamp 20 would operate at a preferred lamp current.

The current sensor output produces a signal proportional to the amount of current flowing to lamp 20. Amplifier 26 increases the output of current sensor 24 to a level suitable for analog/digital conversion. Filter 28 removes unwanted frequencies from the output of amplifier 26. Analog-to-digital converter 30 then converts the signal from filter 28 into an eight bit current sensor output value.

The output of analog-to-digital converter 30 is connected to microcontroller 32. Microcontroller 32 performs operations on the digital output of analog-to-digital converter 30 in accordance with the instruction stored in memory 38.

Microcontroller 32 stores information related to operation of lamp 20 in EEPROM 34. Processor 39 is formed from the combination of microcontroller 32, EEPROM 34 and memory 38. Display 40, connected to an output of microcontroller 32, indicates whether lamp 20 is in fact operating. When pressed, program button 36 causes the lamp monitor to enter the program mode, described in FIG. 3.

In some instances, voltage detector 42 may be provided. Voltage detector 42 is coupled to microcontroller 32 and lamp 20. If a voltage is detected, voltage detector 42 provides a signal to microcontroller 32 so that display 40 can provide further notification of failure.

Load 10, transient suppressor 22, current sensor 24, amplifier 26, filter 28, and voltage detector 42 form channel 44. Each exterior lamp for the motor vehicle has a channel similar to channel 44 dedicated specifically to that exterior lamp. Several channels could be connected to analog-to-digital converter 30.

Microcontroller 32 also is connected to flasher control 50 and flasher control inputs 52. Flasher control 50 consists of a high side driver and a flasher. Flasher controller inputs 52 indicate to microcontroller 32 whether lamp 20 should be flashing. Microcontroller 32 then enables flasher control 50 to cause lamp 20 to flash.

Figure 2:
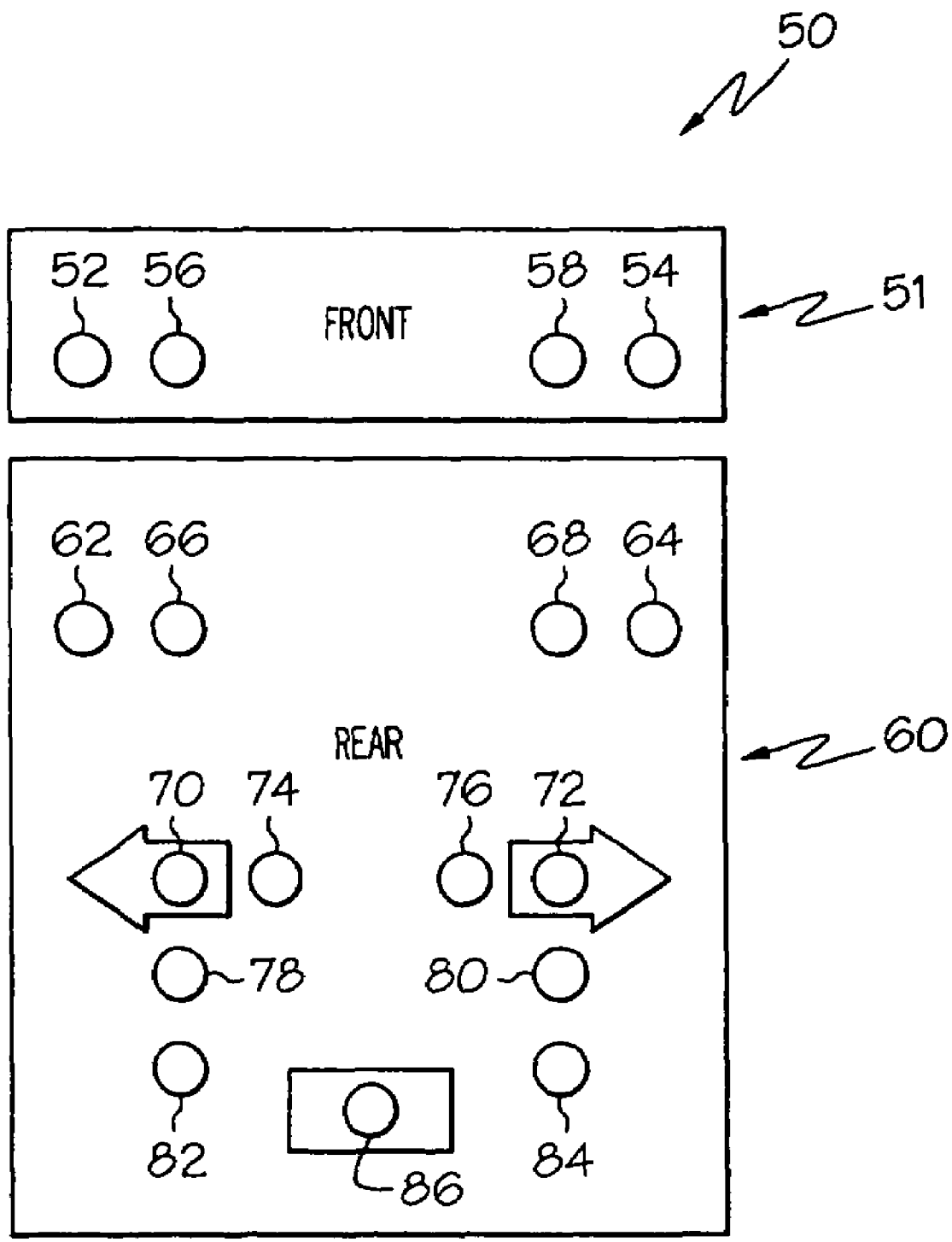
FIG. 2 shows a display for the bus lamp monitor.

FIG. 2 shows display 40 for the system. A number of different types of display could be used, including an LCD or a CRT. Display 40 could also be integrated with the printed circuit board or remotely tethered. Display 40 is mounted near the bus driver.

Display 40 has an indicator lamp for each exterior bus lamp of the bus. The position of the status lamps on display 40 roughly corresponds with the location of the exterior lamps. For example, left turn status lamp 70 is located on the left portion of display. Thus, by observing display 40, the driver can determine whether the exterior bus lamps are properly operating. If display 40 included a reconfigurable LCD screen, then visual information or descriptive text could be shown to assist in identifying the locations.

Upper portion 51 of display 40 contains status lamps 52, 54, 56, 58 associated with exterior lamps located on the front of the bus. Lower portion 60 contains status lamps 62, 64, 66, 68, 70, 72, 74, 76, 78, 80, 82, 84 associated with the exterior lamps located on the rear of the bus.

Battery status lamp 86 is an exception. Battery status lamp 86 denotes whether battery 10 is operating at the required voltage to properly power the lamps. If battery 10 is operating below the minimum battery operating voltage or if battery 10 is operating above the maximum battery operating voltage, battery status lamp 86 is illuminated.

Figure 3:
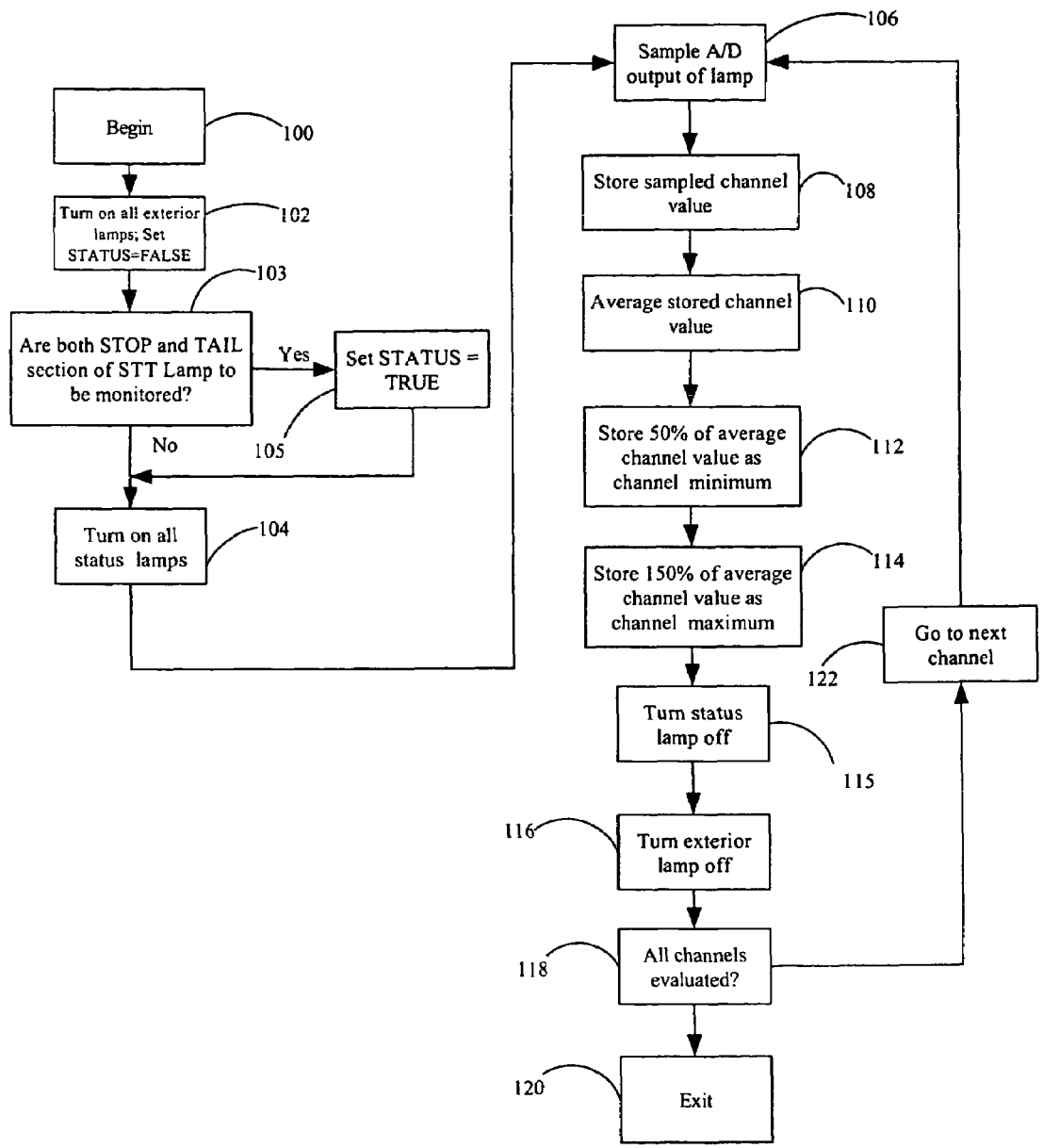
FIG. 3 is a block diagram of the method of operating a bus lamp monitor in program mode.
Figure 4:
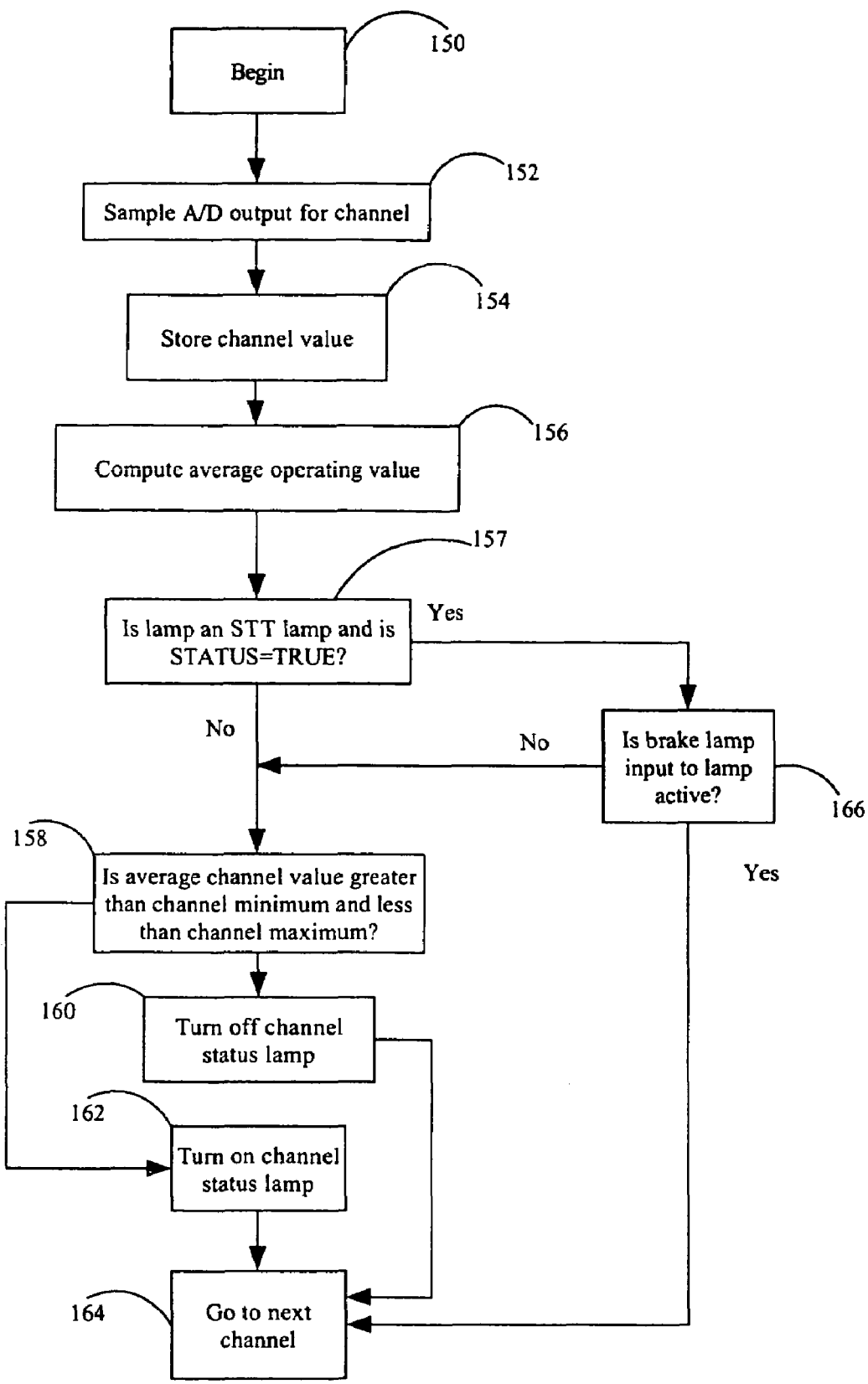
FIG. 4 is a block diagram of the method of operating a bus lamp monitor in operate mode.

FIGS. 3 and 4 show the operation of the system shown in FIG. 1 and the display shown in FIG. 2.

FIG. 3 shows the operation of the lamp monitor in program mode. Lamp monitor enters program mode when program button 36 is pushed. First, the program mode begins. Step 100.

All the exterior lamps are then energized. Step 102. A status bit is set to FALSE. The system then determines whether both the stop and tail section of any STT (Stop/Turn/Tail) lamps are being monitored. An STT lamp is capable of displaying at one of two illumination levels. The illumination level for signaling as a stop light is greater than the illumination level for signaling as a tail light, and, consequently, the STT lamp draws more current when used as a stop light rather than as a tail light. However, an STT lamp is now always used as both a stop light and a tail light.

One way to make that determination is by turning energizing the lights and determining if a current is flowing through the STT lamps. If a current is flowing through the STT lamps, then both the stop and section of the STT lamps are to be monitored. If so, then the status bit is set to TRUE.

All the status lamps are then turned on. Step 104. For a specific lamp, processor 39 samples the output of analog-to-digital converter 30. Step 106. The output of analog-to-digital converter 30 is stored in EEPROM 34 as a digital current sensor output. Step 108. Processor 39 continues to sample and store the digital current sensor output from analog-to-digital converter 30 for a select number (approximately 150) of samples.

After the select number of samples has been stored in memory 38, the samples are averaged. The average represents the preferred lamp current value. Step 110. Processor 39 then multiples the average by 50%, and stores this value as the minimum lamp current value. The minimum lamp current value could be any fraction of the preferred lamp current value. Step 112. Processor 39 then multiplies the average by 150%, storing that value as the maximum lamp current value. Step 114. The maximum lamp current value and the minimum lamp current value define an operating current range for the lamp. The status lamp is then turned off. Step 115. The exterior lamp is then turned off. Step 116.

Processor 39 then determines whether all channels have been checked. Step 118. If so, then the program exits. Step 120. If not, processor 39 checks the next lamp. Step 122. The process of sampling, storing the samples, averaging the samples, and storing the minimum operating voltage and the maximum operating voltage then repeats or continues until all lamps have been checked.

FIG. 4 shows the operation of the lamp monitor in operate mode. Operate mode starts. Step 150. One lamp is monitored. The output of analog-to-digital converter 30 for the lamp is sampled. Step 152. The output of the analog-to-digital converter 30 is stored. Step 154. The sample and store process of step 152 and step 154 are repeated about one hundred fifty (150) times.

When the last sample is stored, the samples are averaged. This average is stored as the actual lamp current. Step 156. If the lamp is an STT lamp and the STT lamp is operating in stop mode, then the next channel is evaluated. Step 166.

If not, then processor 39 compares the actual lamp current with the operating current range for that lamp. Step 158. If the actual lamp current is within the operating current range, then the status lamp for that lamp is illuminated. Step 160. If not, the status lamp is turned off. Step 162. The next lamp is then checked in a similar manner. Step 164. Steps 150 through 164 are repeated for each lamp.

Figure 5:
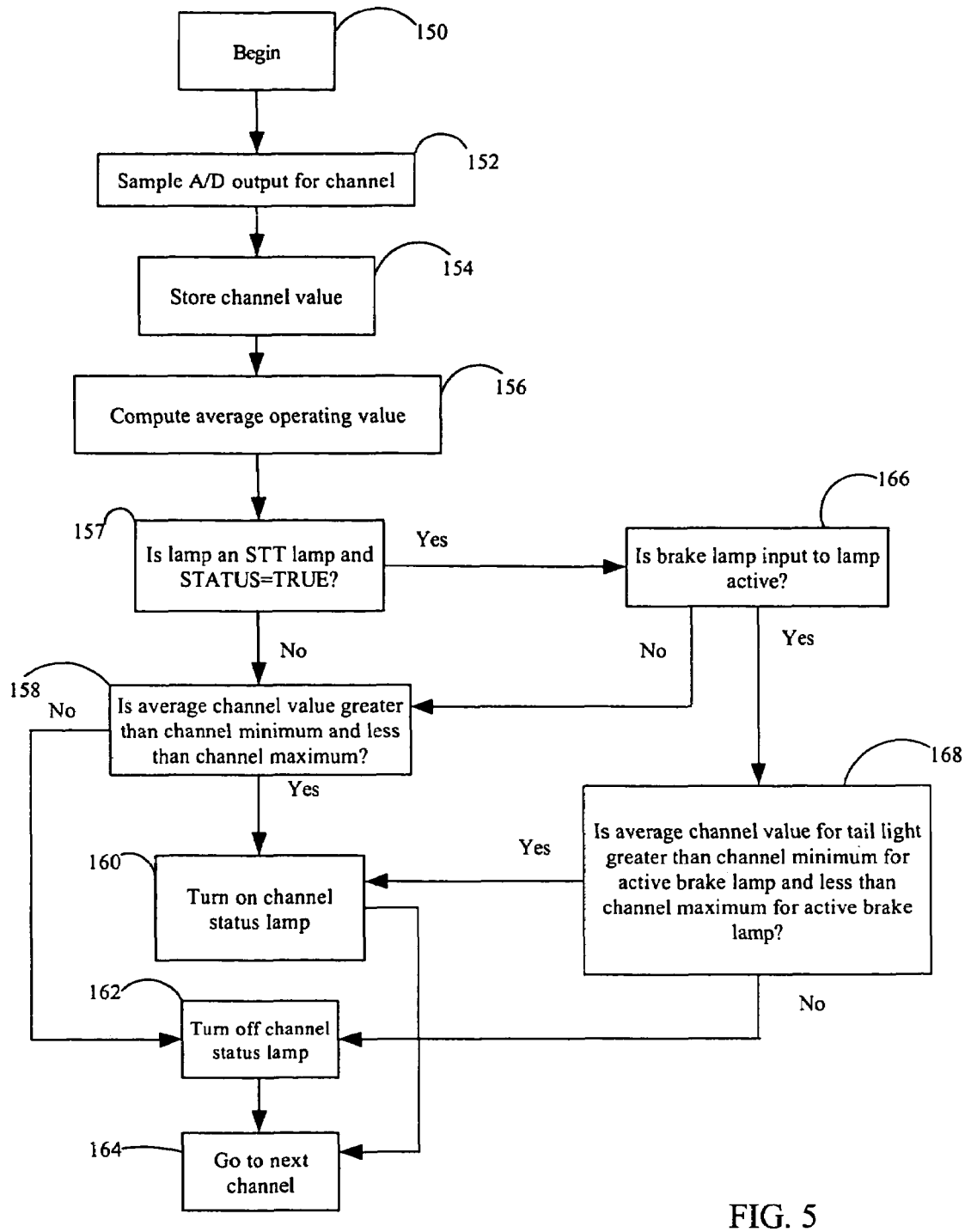
FIG. 5 is a block diagram of an alternative method of operating a bus lamp monitor in program mode.

FIG. 5 shows an alternative method for operating the system. In step 157, if the lamp is an STT lamp, then the system determines whether the STT lamp is operating in stop mode. If not, then it returns to Step 158. If the STT lamp is operating in stop mode, then it determines if the average channel value is greater than the minimum value for the STT lamp operating in stop mode and less than the maximum value for the STT lamp operating in stop mode. Step 168. If so, then the status channel lamp is turned on. Step 160. If not, the channel status lamp is turned off.

In operate mode, the lamp monitor would continually survey each lamp by computing an actual lamp current, comparing that with the operating current range, and then turning on or off the corresponding status lamp.

An example will further explain the operation of the system. If a driver were to press the brakes, and then examine display 40, he would expect to observe status lamps 74, 76 (corresponding to the exterior brake lamps) illuminated. If either of status lamps 74, 76 were not illuminated, then the exterior lamp corresponding to the status lamp is not operational. Thus, the driver would be immediately aware of a problem with the brake lamp, and could then take appropriate corrective action.

The lamp monitor described herein thus accurately monitors different types of lamps drawing different currents. If a particular lamp is replaced, the lamp monitor can be re-programmed to store the operating characteristic of the lamp. Additionally, since coils are not used, the lamp monitor is more stable and much less prone to vary over age.

The above description is of the preferred embodiment. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The invention claimed is:

1. A lamp monitor for a motor vehicle comprising:
   a lamp having an operating lamp current;
   a current sensor coupled to the lamp, and producing a current sensor output, the current sensor output indicative of the operating lamp current;
   a processor for comparing the current sensor output with a minimum lamp current value and a maximum lamp current value; and
   a display for indicating if the current sensor output is below the minimum lamp current value or above the maximum lamp current value.

2. The lamp monitor of claim 1 where the display is coupled to the processor, the display has an indicator, and the indicator is actuated if the operating lamp current is below the minimum lamp current value or above the maximum lamp current value.

3. The lamp monitor of claim 1 where the display is coupled to the processor, the display has an indicator, and the indicator is actuated if the operating lamp current is below the minimum lamp current value or above the maximum lamp current value.

4. The lamp monitor of claim 1 where the processor is coupled to the current sensor.

5. The lamp monitor of claim 4 where the processor includes a memory, and the processor stores a current sensor output value in the memory.

6. The lamp monitor of claim 5 where a preferred lamp current value is stored in the memory.

7. The lamp monitor of claim 6 where the processor compares the preferred lamp current value to the current sensor output value to determine whether the operating lamp current is below the minimum lamp current value or above the maximum lamp current value.

8. The lamp monitor of claim 7 where an analog-to-digital converter is coupled to the current sensor.

9. The lamp monitor of claim 8 where the analog-to-digital converter produces the current sense output value.

10. The lamp monitor of claim 8 where the analog-to-digital converter has a digital current sensor output.

11. The lamp monitor of claim 9 where the digital current sensor output is stored in the memory.

12. The lamp monitor of claim 11 where a plurality of digital current sensor outputs are stored in the memory.

13. The lamp monitor of claim 12 where the processor computes the current sensor output value from the plurality of digital current sensor outputs stored in the memory.

14. The lamp monitor of claim 13 where the current sensor output value is an average of the plurality of digital current sensor outputs stored in the memory.

15. The lamp monitor of claim 14 where the current sensor output value is proportional to the average of the plurality of digital current sensor outputs stored in memory.

16. The lamp monitor of claim 15 where the display includes a display lamp, and the display lamp is illuminated if the current sensor output value is within the operating current range.

17. The lamp monitor of claim 16 further comprising:
    a plurality of lamps, each of the plurality of lamps having a lamp current operating range, the lamp current range indicating a minimum lamp current value or a maximum lamp current value, the display including a plurality of status lamps, where each status lamp is associated with one lamp, and where the analog-to-digital converter is selectively coupled to each of the plurality of lamps.

18. The lamp monitor of claim 17 further comprising:
    a battery for powering the plurality of lamps, the battery having a battery voltage; and
    a battery status lamp, integral with the display, which is illuminated if the battery voltage falls below a minimum battery operating voltage or if the battery voltage rises above a maximum operating voltage.

19. The lamp monitor of claim 18 where the battery is coupled to the analog-to-digital converter, the minimum battery operating voltage is stored in the memory, and the processor determines if the battery voltage is below the minimum battery operating voltage.

20. A method of operating a lamp monitor, the lamp monitor having a lamp and a status lamp, comprising:
    calculating an operating current range for the lamp, the operating current range including a minimum operating current and a maximum operating current;
    determining a lamp current;
    comparing the lamp current with the operating current range; and
    if the lamp current is within the operating current range, then illuminating the status lamp.

21. The method of claim 20 where the step of determining a lamp current comprises the steps of:
    sampling a current flowing through the lamp a predetermined number of times; and
    calculating the lamp current based on the sampling.

22. The method of claim 21 where the step of calculating the lamp value based on the sampling comprises calculating an average from the sampling.

23. The method of claim 22 where the step of calculating an operating current range for the lamp comprises:
    energizing the lamp with an initial lamp current;
    taking a plurality of samples of the initial lamp current; and
    calculating the operating current range from the plurality of samples of lamp current.

24. The method of claim 23 where the step of calculating the operating current range from the plurality of samples of the initial current comprises averaging the plurality of sample of the lamp current.

25. The method of claim 24 where the step of taking a plurality of samples of the lamp current includes converting an analog current signal to a digital current signal.

26. A method of operating a lamp monitor, the lamp monitor having a plurality of lamps and a plurality of status lamps, where each one of the plurality of lamps has a corresponding one of the plurality of status lamps, comprising:
    calculating an operating current range for each of the plurality of lamps by illuminating a select one of the plurality of lamps with an initial current, illuminating a select one of the plurality of status lamps corresponding to the select one of the plurality of lamps, taking a plurality of samples of the initial current, calculating a lamp current from the plurality of samples of the initial current, extinguishing the select one of the plurality of lamps, extinguishing the select one of the plurality of status lamps corresponding to one of the plurality of lamps;
    for each of the plurality of lamps, comparing the lamp current with the acceptable operating current range; and for all of the plurality of lamps, if the lamp current for one of the plurality of lamps is within the operating current range, then illuminating the corresponding one of the plurality of status lamps.

27. The method of claim 26 where the step of calculating a lamp current from the plurality of samples of the initial current comprises averaging the plurality of sample of the initial current.

28. The method of claim 27 where the step of taking a plurality of samples of the initial current includes converting an analog initial current signal to a digital initial current signal.

29. The method of claim 28 where the step of illuminating a select one of the plurality of lamps with an initial current comprises illuminating all of the plurality of lamps with a plurality of initial currents.

30. The method of claim 29 where the plurality of lamps and the plurality of status lamps are powered by a battery, the battery having a battery voltage, further comprising:
monitoring the battery voltage; and
illuminating a voltage battery status lamp if the battery voltage falls below a predetermined voltage.

* * * * *